United States Patent [19]

Elliott et al.

[11] Patent Number: 5,355,024

[45] Date of Patent: Oct. 11, 1994

[54] SOLID STATE FREQUENCY CONVERTER CAPABLE OF MISALIGNED PARALLEL OPERATION

[75] Inventors: Stephen H. Elliott, Troy; Theodore J. Fahrer, Dayton; Allen D. Kelly; Larry E. Heisey, both of Troy, all of Ohio

[73] Assignee: Hobart Brothers Company, Troy, Ohio

[21] Appl. No.: 29,727

[22] Filed: Mar. 11, 1993

[51] Int. Cl.⁵ .............................................. H02J 3/06
[52] U.S. Cl. ........................................ 307/73; 307/44
[58] Field of Search ............... 323/282, 283, 284, 285; 363/21, 50, 9; 307/44, 45, 46, 87, 66, 73, 75, 64, 76

[56] References Cited

U.S. PATENT DOCUMENTS

| | | | |
|---|---|---|---|
| 3,665,495 | 5/1972 | Carter et al. | 307/67 |
| 3,909,621 | 9/1975 | Nollace et al. | 307/87 X |
| 3,932,764 | 1/1976 | Corey | 307/85 |
| 4,516,035 | 5/1985 | Rhoads et al. | 307/66 |
| 4,572,961 | 2/1986 | Borger | 290/4 R |
| 4,695,776 | 9/1987 | Dishmer | 318/14 |
| 4,703,193 | 10/1987 | Kawabata | 307/66 |
| 4,731,690 | 3/1988 | Beg et al. | 361/78 |
| 4,782,241 | 11/1988 | Baker et al. | 307/66 |
| 4,937,462 | 6/1990 | Recker et al. | 307/19 |
| 5,027,046 | 6/1991 | Beg | 318/603 |
| 5,060,131 | 10/1991 | Sikora | 363/21 X |

Primary Examiner—Steven L. Stephan
Assistant Examiner—Y. Jessica Han
Attorney, Agent, or Firm—Biebel & French

[57] ABSTRACT

A ground power unit capable of no-break power transfer includes a rectifier for converting power from commercial mains to direct current, a switching circuit, a power transformer, and a pattern generator for controlling the operation of the switching circuit. Voltage and current sensors monitor whether the phase of the ground power unit is leading or lagging the phase of the aircraft power bus at the tinge of power transfer. The frequency and phase of the pattern generator converter is adjusted to bring the two systems into alignment quickly, well before the power transfer operation is completed. The ground power unit limits the power transfer between the two systems to prevent the overloading of either.

10 Claims, 12 Drawing Sheets

SOLID STATE FREQUENCY CONVERTER CAPABLE OF MISALIGNED PARALLEL OPERATION

BACKGROUND OF THE INVENTION

This invention is directed to a method and apparatus for connecting a ground power unit to an existing aircraft power bus under what is known as a no-break power transfer (NBPT) operation.

Modern day commercial aircraft employing sophisticated on-board electronic equipment require that the power transfer between the aircraft power generating systems, such as engine driven generators or an auxiliary power unit (APU), and a ground power unit (GPU) be accomplished without any interruption or break whatever. In these aircraft, after a ground power unit is attached to the aircraft, the pilot activates a power transfer switch and power transfer will take place with both systems being on line simultaneously for a brief interval, Until that connection is actually made, however, the ground power unit is isolated from the aircraft power system and cannot detect any characteristic of the aircraft power bus, and in particular, it cannot detect the relative phase between the two systems; therefore no adjustment of the phase angle of the GPU can be made beforehand.

On the other hand, the electrical system of some aircraft can monitor both power systems and will accomplish power transfer only when the phase difference is 90° or less, depending on the system. In other aircraft, the connection is made without regard to the relative phase angles. Connecting the two systems with large phase angle differences could cause one or both of the systems to disconnect or fail.

Since there is no pre-connection detection of the relative phase of the two systems at the GPU side of the system, the GPU must be capable of adjusting quickly when the connection is actually made, to remain on line throughout the connection process, and to provide the proper voltage and frequency to the aircraft while at the same time preventing any failure or damage to either power system.

Accordingly, there is a need for a ground power unit that can interface with an aircraft electrical system to provide an uninterrupted source of power of the proper voltage and frequency even when the two systems are not in phase at the time they are initially interconnected.

SUMMARY OF THE INVENTION

This invention relates to a ground power unit including solid state frequency converter for providing a source of power to aircraft and which is capable of being connected to an aircraft power system regardless of the relative phase angles. The frequency converter includes a rectifier circuit to convert the incoming energy to direct current, which is then pulse width modulated by a switching circuit to provide a 400 Hz square wave to a three phase transformer or an equivalent array of single phase transformers.

In the present invention, sensors monitor whether the phase of the ground power unit is leading or lagging the phase of the aircraft power bus. The frequency of the ground power unit's converter is quickly adjusted to bring the two systems into alignment well before the aircraft's power is disconnected. During the transition between initial connection to the aircraft bus and the aircraft power system being disconnected, the ground power unit will limit the power transfer between the two systems to prevent the overloading of either. The ground power unit will also limit the power transfer between the two systems when the aircraft power bus is being transferred back from the ground power unit to onboard power sources.

As described herein, sensors determine whether excessive real power is flowing into or out of the ground power unit. Power flowing into the ground power unit is called "reverse" power while power flowing out of the ground power unit is called "forward" or "normal" power. Reverse power flow causes energy to be stored in filter capacitors of the direct current portion of the power supply, and this energy causes the voltage on the direct current bus to rise to levels above normal design values. When this condition occurs, the phase and frequency of the switching circuit is adjusted to prevent further reverse power and to eliminate the stored energy. Excessive forward power is detected by sensing the current flow out of the power supply, and when this is detected, the frequency and phase of the switching circuit is again adjusted to bring the current back within limits. If damaging levels of current are detected from the switching transistors to the transformer, the amplitude of the voltage to the transformer is immediately lowered to limit the available power and to protect the aircraft and ground power supplies while the phase and frequency of the switching circuit are adjusted to match the aircraft power bus. When a proper match is made, the proper voltage amplitude is reestablished to allow continued parallel operation for the remainder of the transfer interval.

Accordingly, it is an object of this invention to provide a ground power unit that can interface with an aircraft electrical system to provide an uninterrupted source of power of the proper voltage and frequency even when the two systems are not in phase at the time they are initially interconnected.

It is another object of this invention to provide a ground power unit that will not disconnect itself from an aircraft power bus due to the ground power unit and aircraft power sources being out of phase at the time they are temporarily connected together.

It is still another object of this invention to provide a power supply for use in a no-break power transfer connection to an active aircraft power bus comprising a direct current source of power, a transformer having at least one primary winding and at least one secondary winding, switching means connected between the primary winding of said transformer and said direct current source for providing pulses of direct current to said transformer, a frequency determining circuit having a predetermined nominal frequency output connected to control the operation of said switching circuit, means for sensing whether the output of said secondary winding of said transformer has a leading or lagging phase angle relative to the current on said aircraft power bus, and control circuit means responsive to said sensing means detecting a lagging phase angle for increasing the nominal frequency of said frequency determining circuit in small increments at regular intervals until the output frequency of said transformer is in phase with the aircraft power bus, said control circuit means being responsive to said sensing means detecting a leading phase angle for decreasing the nominal frequency output of said frequency determining circuit in small increments at regular intervals until the output frequency of said transformer is in phase with the aircraft power bus.

Other objects and advantages of the invention will be apparent from the following description, the accompanying drawings and the appended claims.

DESCRIPTION OF THE PREFERRED EMBODIMENT

Figure 1:
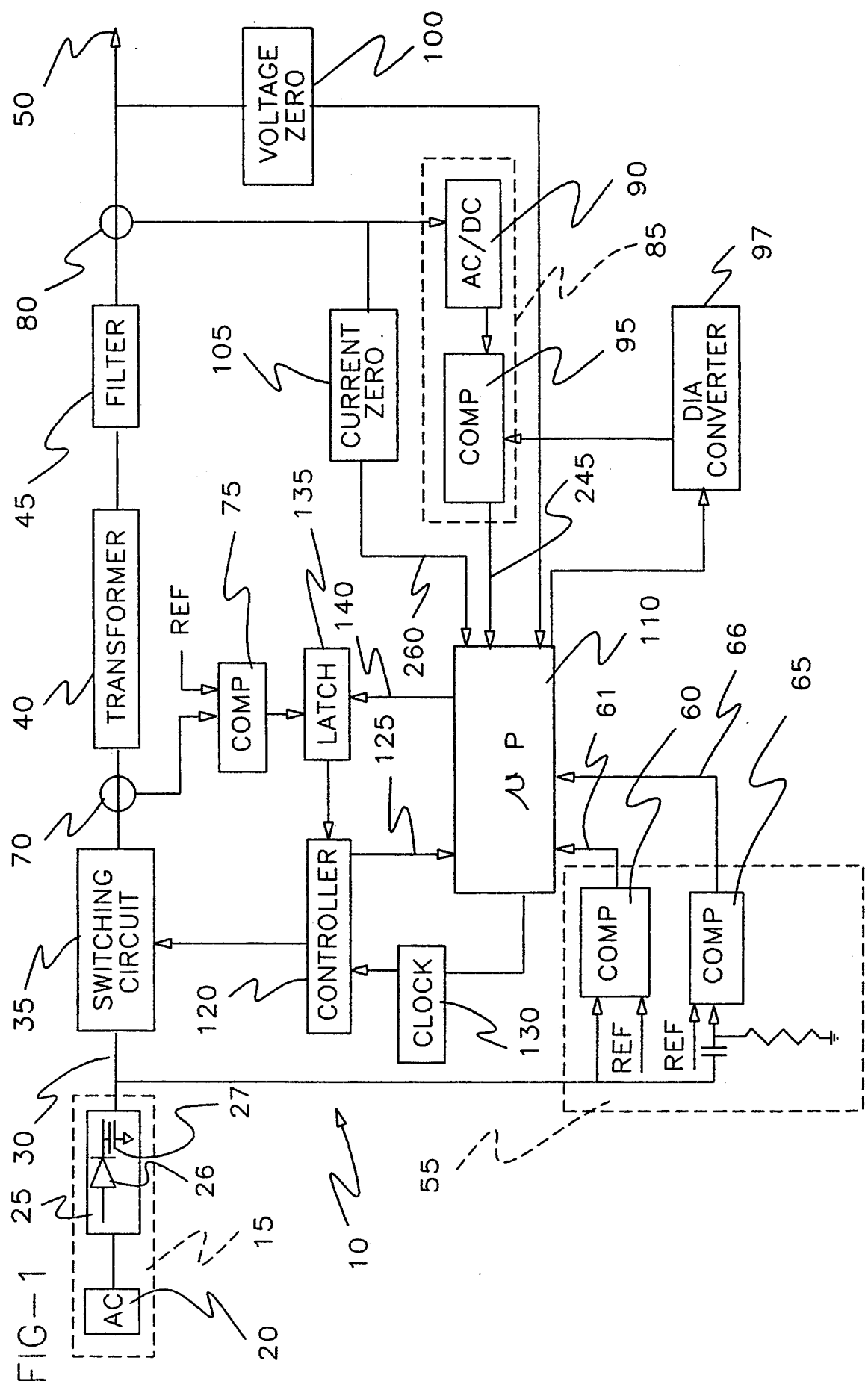
FIG. 1 is a simplified electrical block diagram of the ground power supply or unit of the present invention.

Referring now to the drawings which show a preferred embodiment of the invention, a novel power supply or ground power unit (GPU), shown generally at 10 in FIG. 1, includes a direct current source of power 15 which may include an alternating current source 20, either from commercial mains or from a motor-generator, and a DC converter 25 including a set of rectifiers 26 and filter capacitors 27 for converting the alternating current to direct current on bus 30. A switching circuit 35 is placed between the direct current bus 30 and a transformer 40, which is typically a three-phase 400 Hz transformer, although an array of three or more single phase transformers could also be used. The current output from the transformer 40 is applied through a filter 45 to an output connector 50, which is the connector that is plugged in or attached to an aircraft.

The voltage on bus 30 is monitored by an over voltage detection or sensing circuit 55 that includes a first voltage comparator 60 and a change-in-voltage comparator 65. The current flowing between switching circuit 35 and transformer 40 is monitored by a first current sensor 70 whose output is applied to a first current comparator 75.

The current output of the power supply 10 to an aircraft at connector 50 is monitored by a second current sensor 80, and its output is applied to an output current detector circuit 85 which includes a rectifier 90 and comparator 95. A voltage zero crossing detector 100 and a current zero crossing detector 105 are also connected to the output of the power supply.

The power supply of the present invention uses a microprocessor 110 to control the operation of a pattern generator or controller 120, a device which determines when and for how long each switching transistors in the switching circuit 35 is gated on, and thus the frequency, phase and amount of power applied to the transformer 40.

The microprocessor 110 monitors outputs from comparators 60, 65, 95 and zero crossing detector 100. It also receives a signal on line 125 from the controller 120 indicating the actual phase angle of the control signal to a selected one of the switching transistors in circuit 35. The microprocessor 110 provides an output to control the frequency of a frequency determining circuit or clock 130 which provides a frequency input signal to the controller 120. While the clock 130 is shown as a separate element for clarity of explanation, it is included as part of the microprocessor itself in the preferred embodiment of this invention.

A latch circuit 135 is connected to the controller 120 to force it to 0% modulation whenever it is set by a signal from the comparator 75; the latch is cleared by a signal on line 140 from the microprocessor 110, as will be explained.

Figure 2:
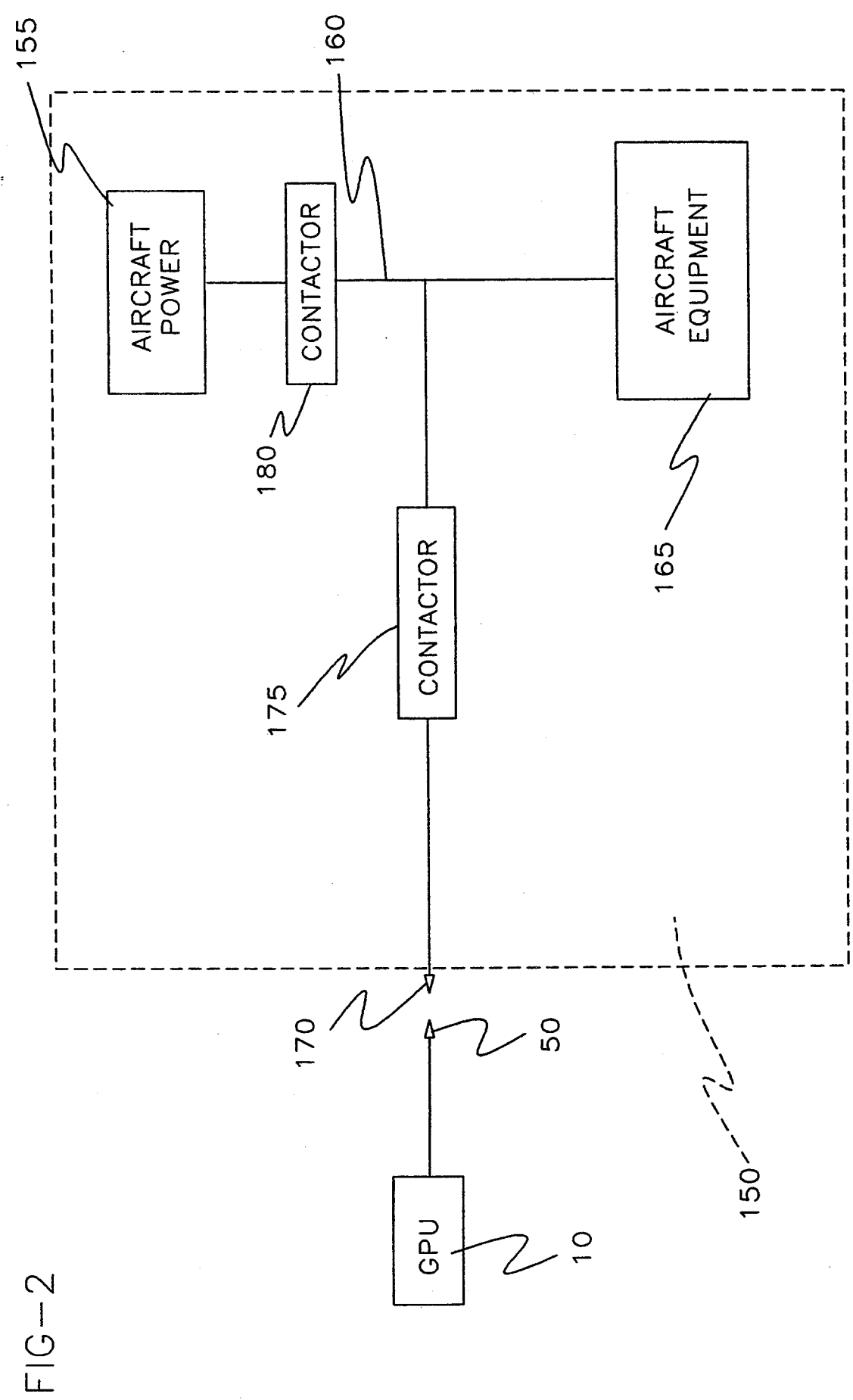
FIG. 2 is a simplified electrical block diagram showing the means for connecting the ground power unit of this invention with a typical aircraft power bus.

Referring now to FIG. 2, an aircraft shown generally at 150 includes an aircraft source of power 155 which provides 400 Hz alternating current power on an electrical bus 160 to run the equipment in the aircraft, shown generally at 165. The aircraft source of power 155 may be derived from its engines or an auxiliary power unit. The ground power supply 10 of the present invention, which is provided with an output connector 50, is connected to a mating receptacle 170 on the aircraft and is connected through a contactor 175 to the aircraft bus 160. Another contactor 180 is provided to isolate the aircraft power 155 from the bus 160 after the external power supply 10 has taken over. Typically, the closure of one of the contactors will cause the other contactor to be opened, but this will cause both to closed for approximately 50 milliseconds. It is during this time period that an over current condition could occur that might cause damage should either the aircraft or the ground power sources be overloaded.

Depending on the type of aircraft, the contactors 175 and 180 may be automatically controlled, or manually controlled from the aircraft cockpit. In many cases, the connection of the ground power unit 10 to the aircraft electrical bus 160 may be made at any time, even when the phase of the two electrical systems 10 and 155 may differ by as much as 180°. Since the ground power unit 10 cannot detect the phase of the aircraft power supply until after connection has actually been made, control circuitry in the ground power supply 10 is provided to insure that no damage to either the aircraft power source 155 or the ground power supply 10 will occur, and that the ground power supply will not disconnect itself from the aircraft.

This is accomplished in the present invention by sensing whether the phase of output current from the ground power unit is leading or lagging the phase of the power on the aircraft power bus 160. The frequency of the ground power unit's converter is then quickly adjusted to bring the two systems into alignment well before the aircraft's power is disconnected. While this adjustment is being made, the power output from the ground power supply 10 will be limited to prevent overloading either the aircraft power supply 155 or the ground power supply 10.

Figure 3:
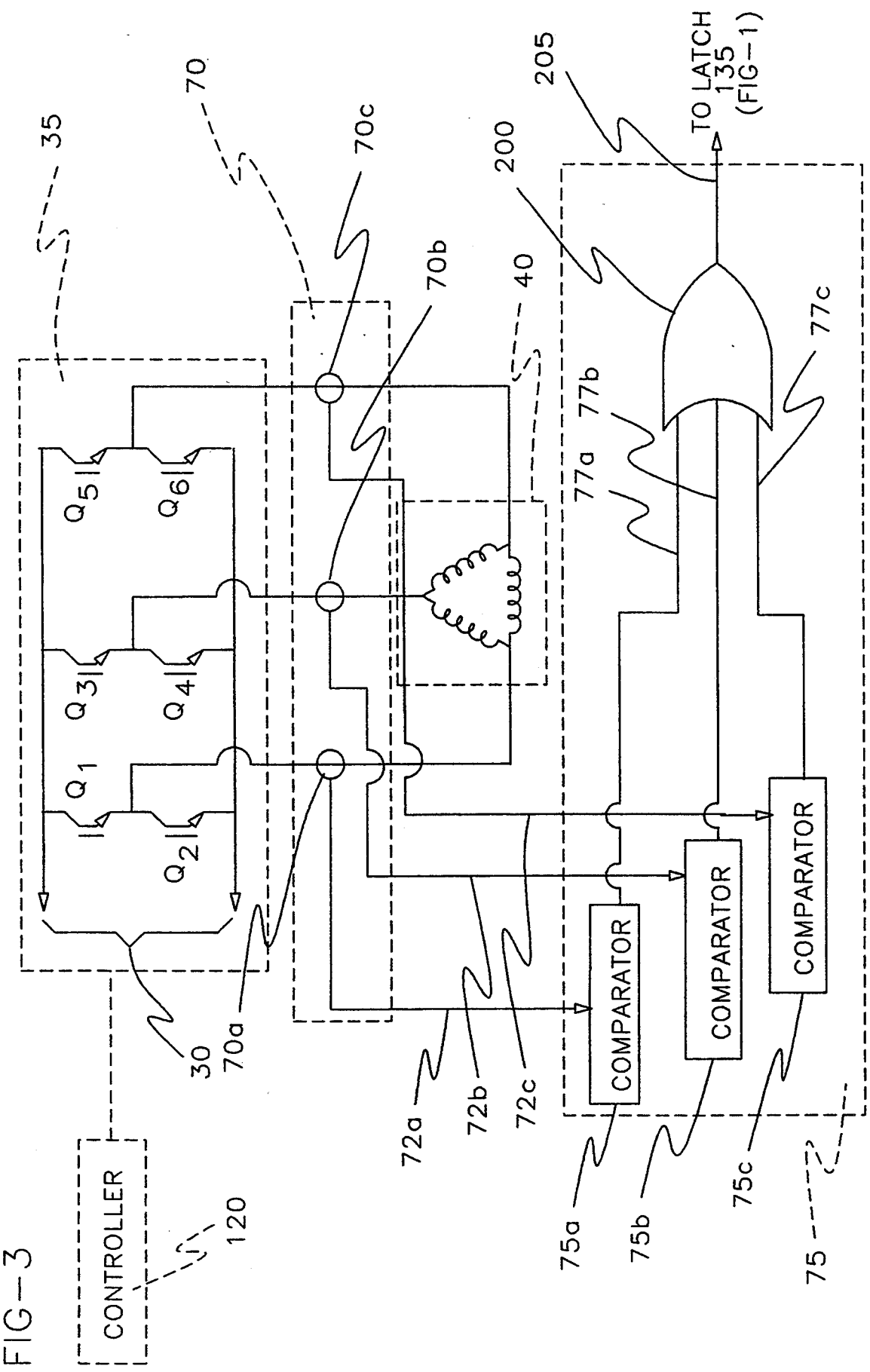
FIG. 3 is an electrical schematic diagram of a circuit for sensing the current flowing between switching transistors and a transformer.

FIG. 3 shows a circuit for sensing the current flowing between the switching circuit 35 and the delta connected primary windings of transformer 40. The current sensor, previously identified as the first current sensor 70, includes three Hall effect current transformers 70a, 70b and 70c connected to the output lines between the switching transistors Q1–Q6 and the delta windings of transformer 40. The outputs from the Hall effect transformers on lines 72a-72c are applied to a current comparator circuit shown generally at 75. Comparator circuit 75 includes three identical comparator circuits 75a, 75b and 75c which have their outputs applied to OR gate circuit 200 which in turn provides an output on line 205 to latch 135. It is to be understood that a second switching circuit could be provided to share the current load, thus permitting the use of lower power rating switching transistors.

Figure 4:
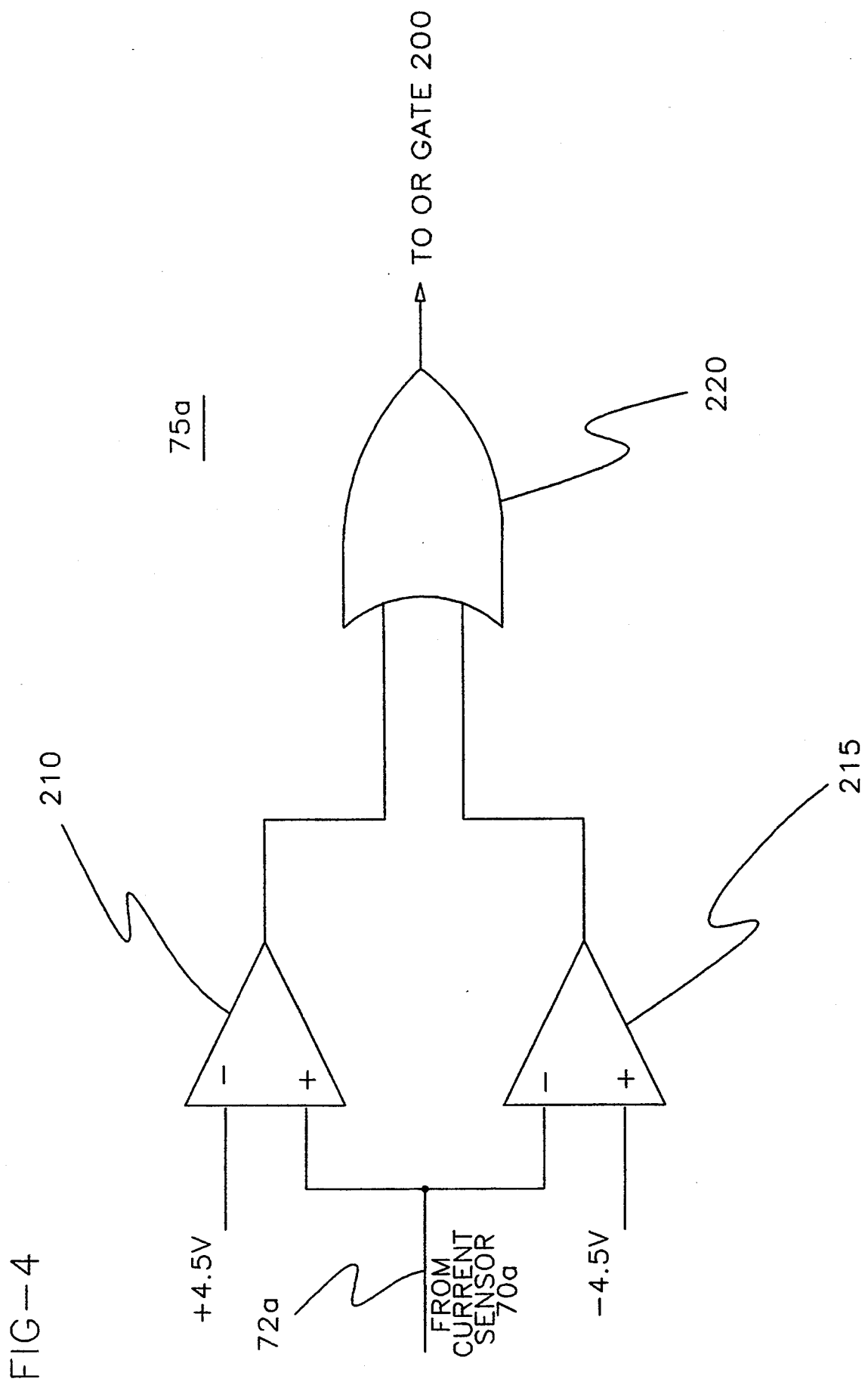
FIG. 4 is an electrical schematic diagram of a comparator circuit used with the transistor current sensor.

FIG. 4 shows one of the comparator circuits, for example 75a, and it includes a first comparator 210 for monitoring the current when the current flows in a positive director, and a second comparator 215 for monitoring the current when the current flows in a negative direction. The comparators 210 and 215 are connected to an OR gate 220 whose output is applied to OR gate 200. Hall effect transformer 70a provides a 1 volt output for each 100 amps of current detected, and therefore, a reference voltage of 4.5 volts to comparator 210 and a reference voltage of −4.5 volts to comparator 215 will yield an output on line 77a whenever the current flow equals or exceeds 450 amperes.

Figure 5:
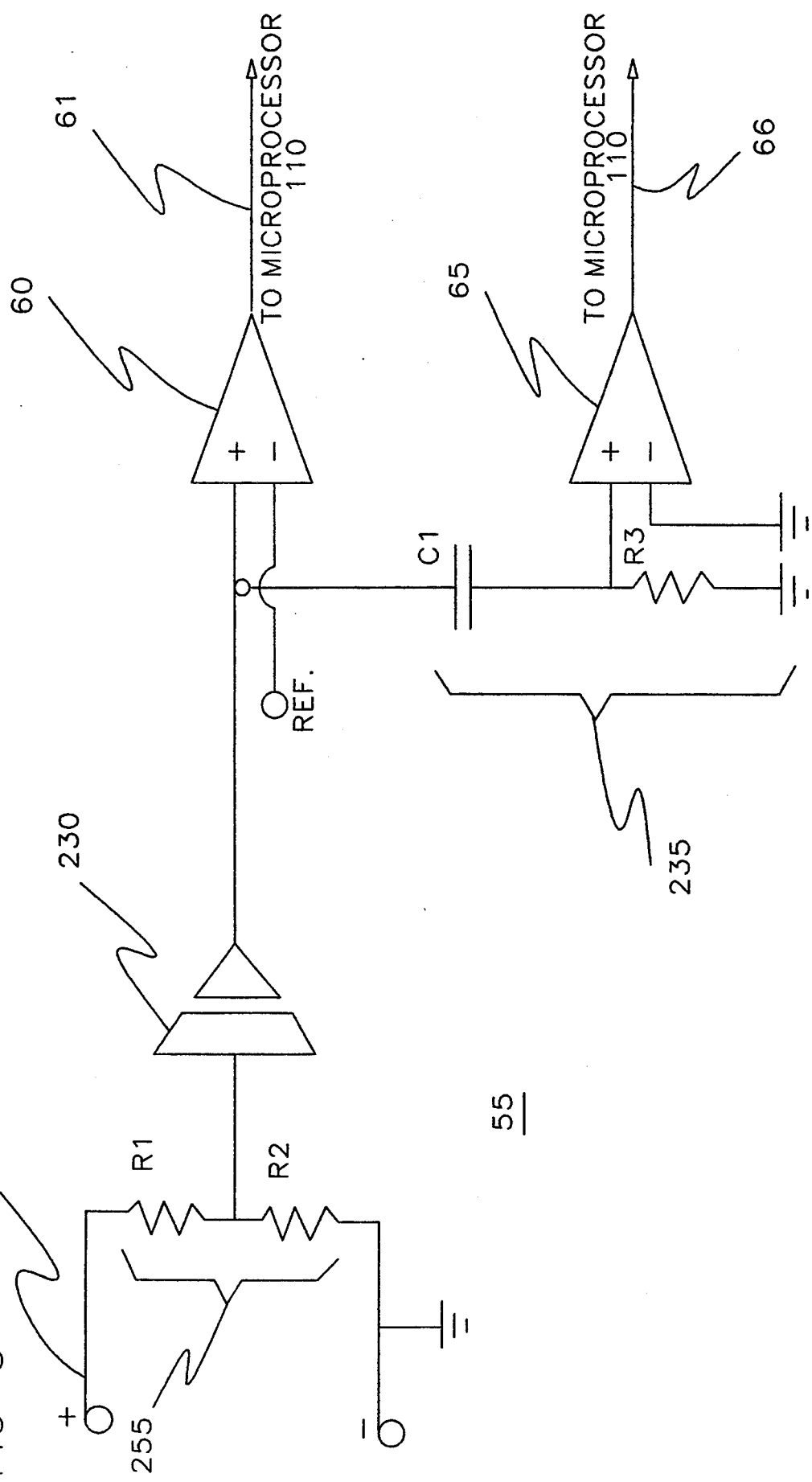
FIG. 5 is an electrical schematic diagram of an overvoltage detecting circuit.

FIG. 5 shows the details of the over-voltage detection circuit 55. A voltage divider network 255 includes resistors R1 and R2 connected between the DC bus 30 and ground. If resistor R1 has a value of 199 KOhms and R2 is 1 KOhm, a reference voltage input of 3.5 volts to isolation amplifier 230 will represent 700 volts on the DC bus. The output of the isolation amplifier is the same as its input, except that it is completely isolated and thus protected from the DC bus; this output is applied both to comparator 60 and through a differentiator circuit 235 comprising capacitor C1 and resistor R3 to comparator 65. A high output on line 61 from comparator 60 indicates that the voltage on DC bus 30 is over 700 volts while a high output on line 66 indicates that the voltage DC bus 30 is rising or increasing. Both lines 61 and 66 are applied as inputs to the microprocessor 110.

Figure 6:
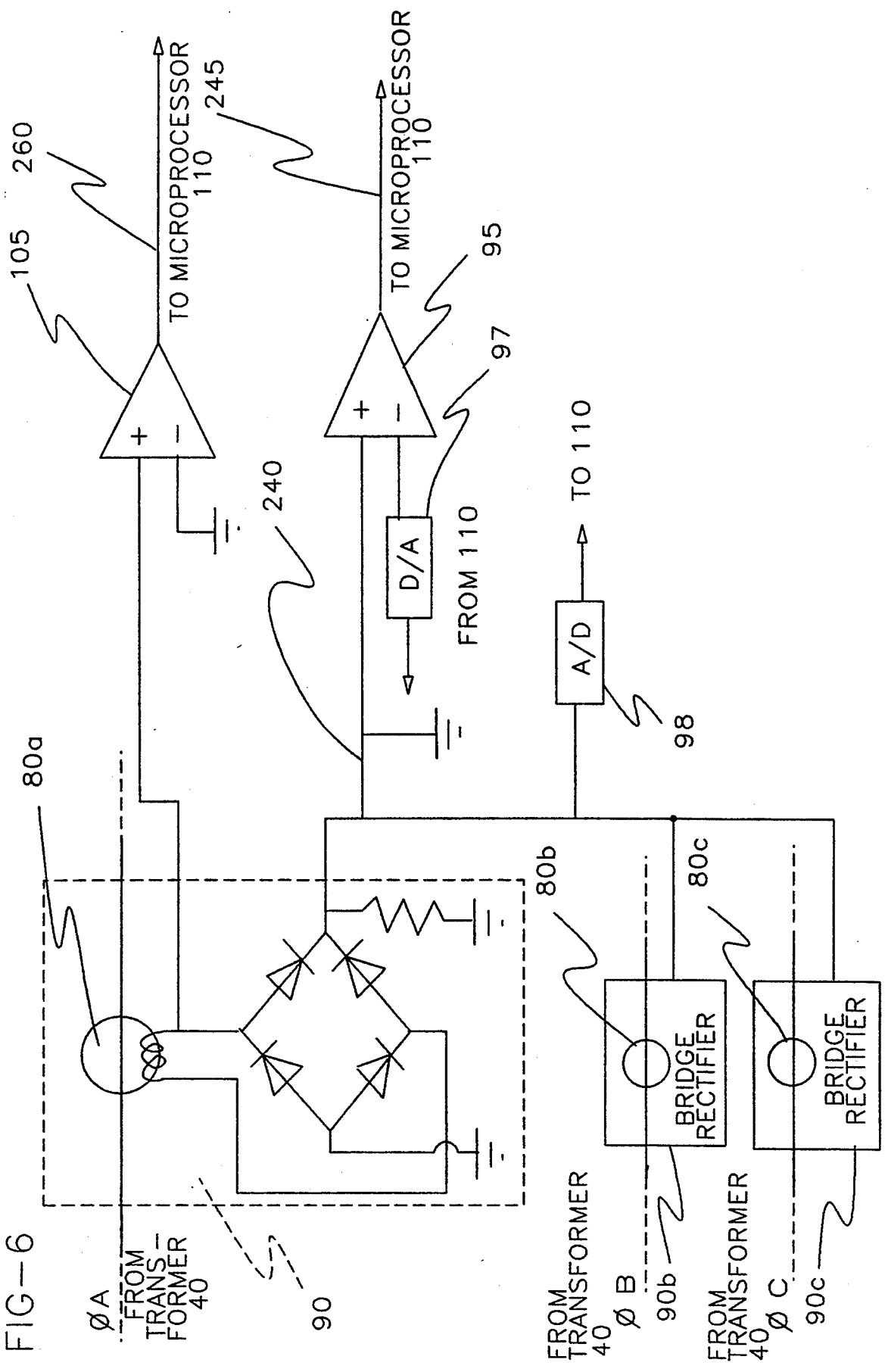
FIG. 6 is an electrical schematic diagram of the output current sensing circuit.

FIG. 6 shows the output current detector circuit 85; it includes three separate bridge rectifier circuits 90a, 90b and 90c connected to convert the outputs of current transformers 80a, 80b, and 80c to a DC voltage. These outputs in turn represent the current from each leg of the Y-connected secondary windings of three-phase transformer 40, to a direct current voltage representing the actual current for each phase out the output between the ground power unit 10 and the aircraft 150. In the preferred embodiment, the output voltage of the three rectifiers is combined on line 240, which represents the average current output of transformer 40, and this voltage is applied to comparator 95.

The reference voltage to the comparator 95 is determined by the microprocessor 110 through a digital-to-analog (D/A) converter 97. The comparator 95 will provide an output on line 245 whenever the actual current exceeds the reference voltage output of reference source 97, indicating current flow above the threshold level. Line 245 is connected to microprocessor 110. The voltage on line 240 is converted directly to digital format by an analog-to-digital (A/D) converter 98 and sent to the microprocessor as an indication of actual current flow, as will be explained. It should be understood that the A/D converter 98 could be incorporated as a part of the comparator 95 and D/A circuit 97 with the microprocessor 110 providing different reference voltages at different times according to which current value is being measured.

Figure 7:
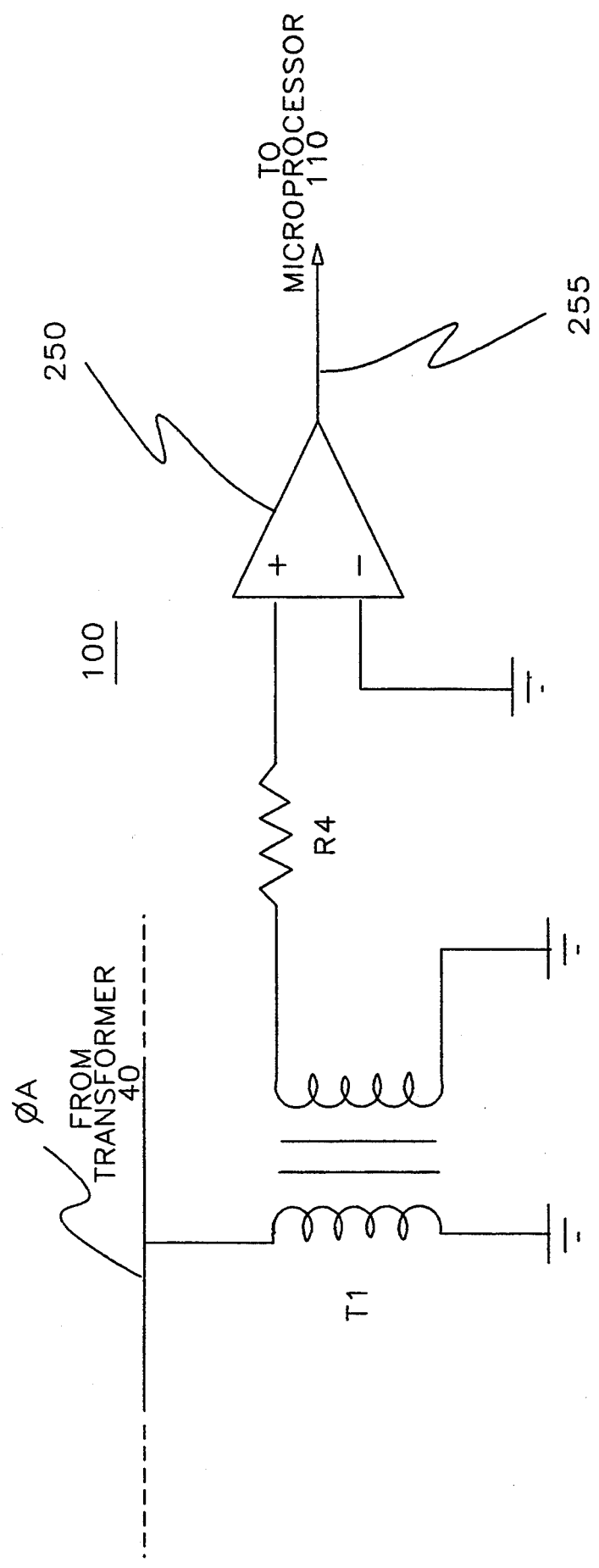
FIG. 7 is an electrical schematic diagram of a zero-crossing detecting circuit.

FIG. 7 is an electrical schematic showing the voltage zero crossing detector 100. This circuit is connected to one of the three phase outputs of transformer 40 and includes a potential transformer T1, the secondary winding of which is connected through resistor R4 to comparator 250. The reference input to comparator 250 is grounded, so whenever the voltage on a selected line, ØA for example, passes through zero, an output will be generated on line 255 and information is applied as an input to microprocessor 110.

The current zero crossing detector 105 (FIG. 6) is similar in that it merely picks off a signal from one of the current transformers 80 and compares that signal to ground, and when the signal passes through zero, an output will be generated on line 260 and sent as an input to the microprocessor 110.

Figure 8:
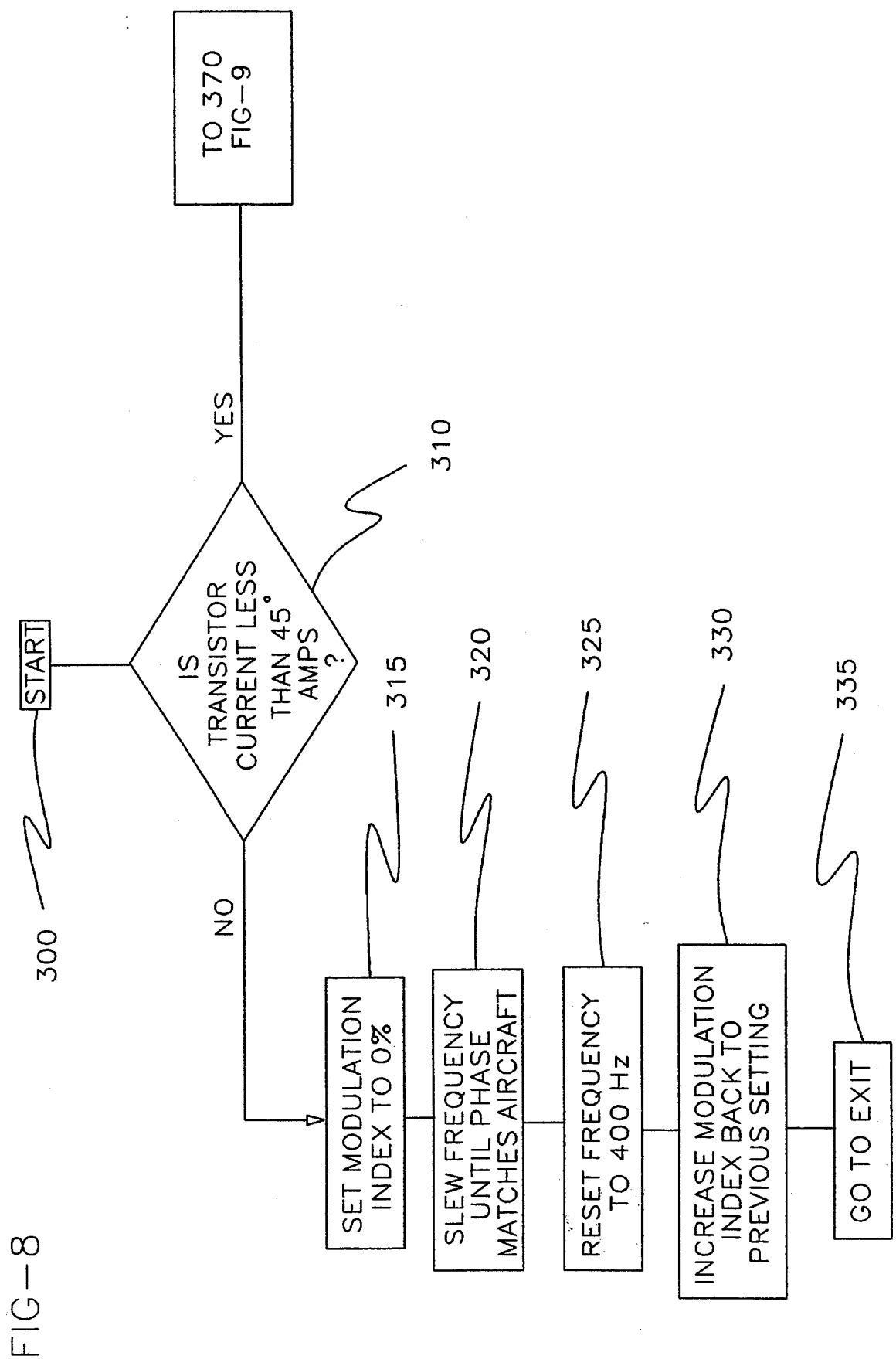
FIGS. 8–12 taken together comprise a computer flow chart showing the decisions and action taken upon analysis of the voltage and current levels detected within the ground power unit of the present invention.

The operation of the power supply 10 will now be described by reference to the computer flow charts of FIGS. 8–11. The routine described in these flow charts is run approximately every 2.5 milliseconds. Referring first to FIG. 8, the start of the routine is represented by block 300. In decision block 310, the question is asked whether any of the transistors in switching circuit 35 is providing current more than a predetermined value, or in the embodiment shown, more than 450 amps, to the transformer 40. This current limit was chosen to protect the transistors comprising the switching circuit 30 from damage and would be determined in other applications by the characteristics of the transistors themselves. This condition is determined by the circuit shown in FIG. 3, including the current sensor 70 and the comparator circuit 75.

If so, then the transistors are immediately switched off by means of a signal on line 205 to latch circuit 135 which sets the modulation index to 0% (block 315) within the controller 120. Since the modulation index is 0%, the transistors are thus protected from damage. The computer 110 causes the frequency of the clock 130 to be slewed until the zero crossing from circuit 100 matches the zero crossing indication on line 125 (block 320), then the clock in immediately set to 400 Hz (block 325), the percentage of modulation is returned to its former value (block 330) by clearing the latch 135 by means of a signal on line 140, and then the routine proceeds to the exit routine of FIG. 12 (block 335).

In normal operation, the clock 130 will be reset the first time a zero crossing is detected, or in other words, within a half-cycle, but the loop represented by blocks 320 and 325 will wait for a complete cycle before releasing the latch and returning the switching modulation to its previously established value. This part of the routine is used primarily whenever the GPU is initially connected to the aircraft bus 160 by operation of the contactor 175, or when the aircraft power supply is brought back on line and connected to the aircraft bus by operation of contactor 180 and the phase difference between the two power sources differ considerably. It is also used should the output of the power supply 10 become short circuited.

Figure 9:
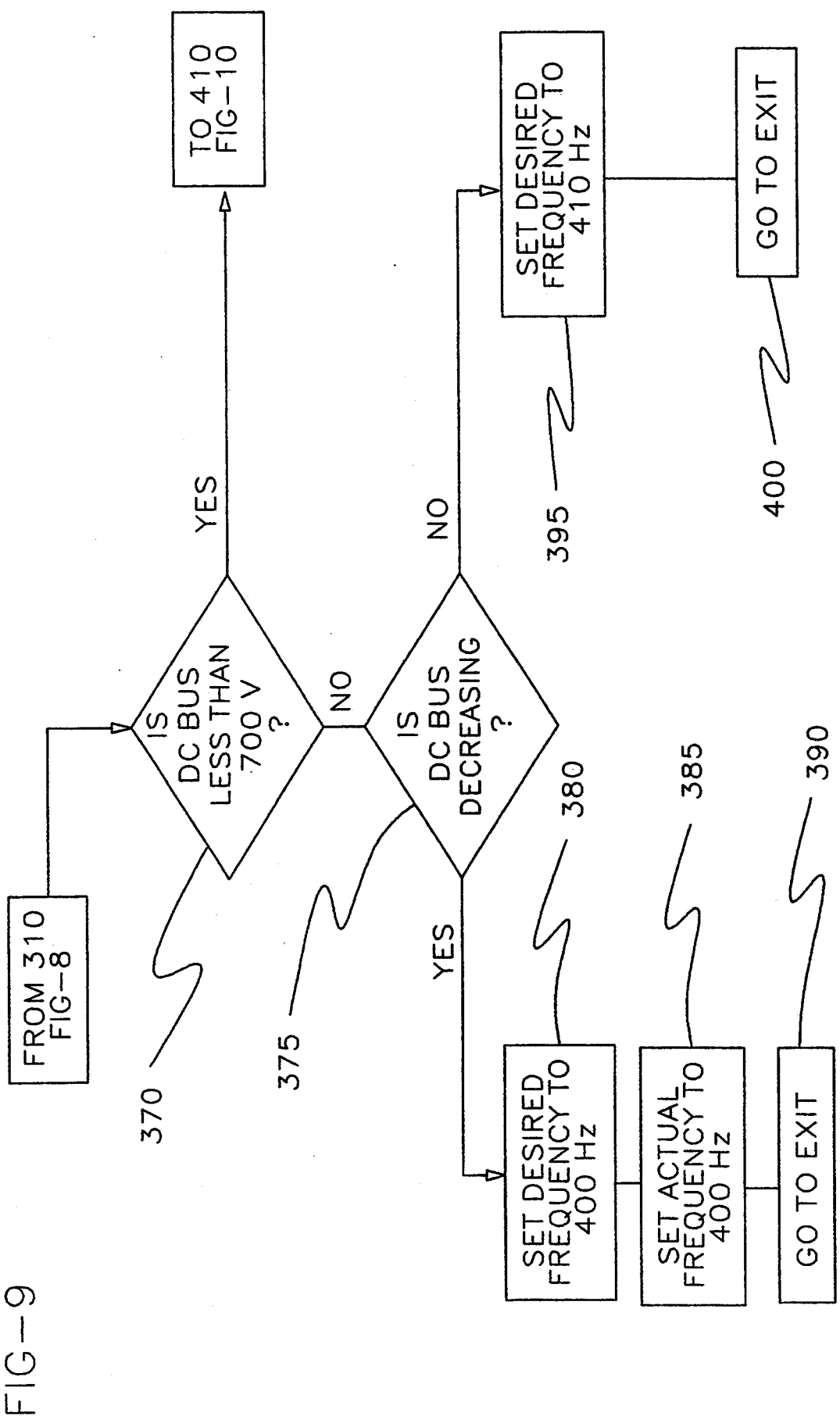
Figure 10:
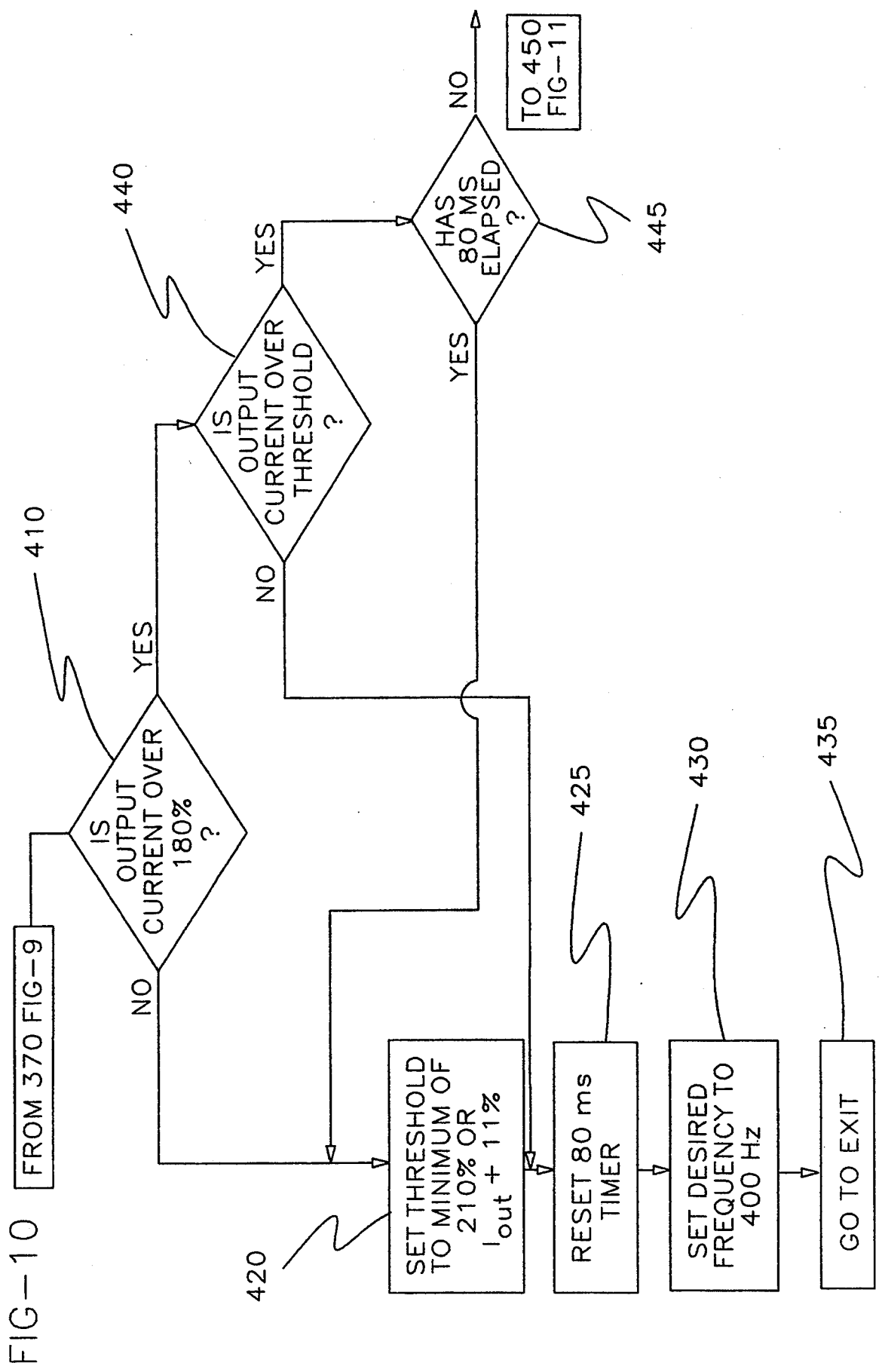
Figure 12:
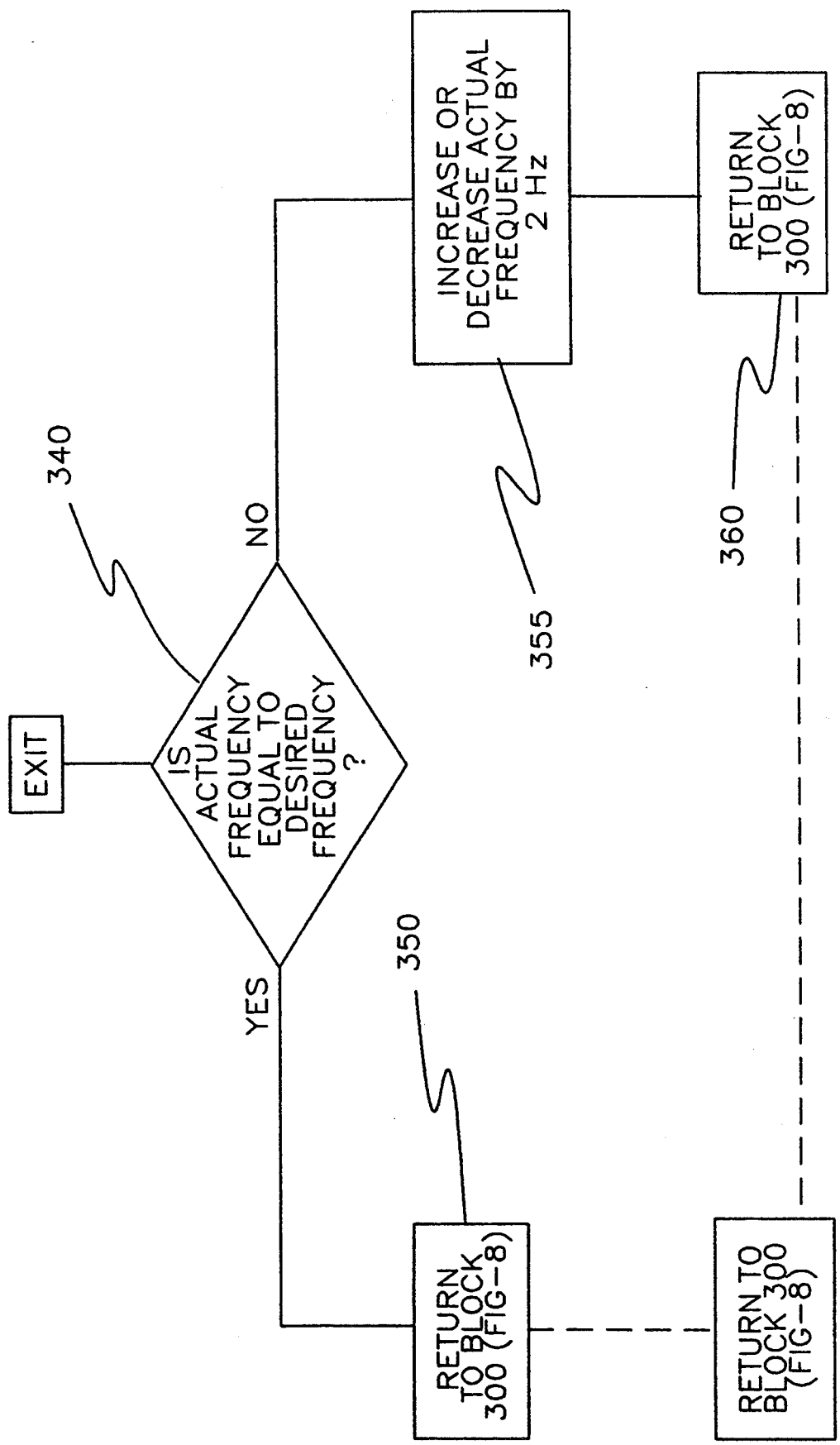

The exit Routine in FIG. 12 is common to FIGS. 8–10 and includes the following steps: if the actual frequency of the clock 130 is equal to the desired frequency (block 340), as determined by the microprocessor 110, then nothing further will take place and the routine will return (block 350) to the beginning of the program (block 300, FIG. 8). On the other hand, if the actual frequency does not equal the desired frequency, then the frequency of clock 130 will be increased or decreased by 2 Hz (block 355) and the cycle repeated (block 360).

If the current sensor 70 does not detect transistor current in excess of the predetermined value, for example 450 amps, (block 310 of FIG. 8), then the routine of FIG. 9 will be accessed. In block 370 of FIG. 9, the question is asked whether the voltage on the DC bus 30 exceeds 700 volts as indicated by comparator 60 (FIG. 5). If it exceeds 700 volts but is decreasing, as represented by the output from the comparator 65 (block 375), then the desired frequency of the clock 130 is set to 400 Hz (block 380), the actual frequency of the clock 130 is also set to 400 Hz (block 385) and the routine exits (block 390) to FIG. 12.

If the voltage on the DC bus 30 is greater than 700 volts and is not decreasing, then the desired frequency of clock 130 will be set to 410 Hz (block 395) and the routine exits (block 400) to FIG. 12.

If the voltage on the DC bus 30 is less than 700 volts, then the routine illustrated in FIG. 10 will be used. In this routine, the question is asked whether the output current, as measured by current sensor 80 in FIG. 1, is over or under 180% of the current rating of the cable to the aircraft (block 410) as indicated by A/D 98. If it is under 180%, then a current threshold is set to a minimum value of 210% of the cable current rating or the current value of the current, as measured by current sensor 80, plus 11%, which ever is greater (block 420). An 80 millisecond timer is provided within the microprocessor 110, for purposes which will be later explained, and that timer is reset (block 425). The desired frequency of the ground power unit is set at 400 Hz (block 430), and the routine exits (block 435) to FIG. 12.

On the other hand, if the cable current is over 180% of rating, then the question is asked (block 440) whether the current is over the threshold set in block 420 as provided by the output of comparator 95. If not, then the routine branches to block 425, the 80 millisecond timer is reset, and the routine proceeds as explained above.

If the current as measured by current sensor 80 is over the threshold, then the question is asked whether 80 milliseconds have elapsed (block 445) since the overcurrent condition was detected at block 440. If the 80 milliseconds time period has elapsed, then the routine branches to block 420, the current threshold is reset to at least 210% or actual current plus 11% by the microprocessor through D/A 97 (FIG. 6) and the routine proceeds as explained above, If the 80 millisecond time period has not elapsed, then routine is passed to block 450 of FIG. 11 where the phase of the current output is tested, as detected by the current zero crossing detector 105. If it is determined to be over 90°, then the desired frequency is set to 410 Hz. in block 455 and the routine exits (block 460) to FIG. 12. If it is not, then the desired frequency of the clock 130 is set to 390 Hz (block 470) and the routine exits (block 475) to FIG. 12.

In summary, if the phase angles of the GPU and the aircraft bus are out of phase by more than about 40°, this condition will be detected by the current sensor 70 and current comparator 75 and the modulation index of the switching transistors will be forced to 0%. This means in practice that either all transistors on the positive rail of the DC line 30 are turned on or that all transistors on the negative rail are turned on, one or the other. Setting the modulation index to 0% will therefore create a short circuit on the primary windings of transformer 40. This short circuit limits current flow in the transformer secondary windings and results in no net power being transferred through the transistors, although large reactive currents will flow elsewhere. The phase of the alternating current on the aircraft bus is detected by voltage zero crossing detector 100 and current zero crossing detector 105, and the frequency determining circuit or clock 130 is quickly brought into synchronism and the power output is reestablished by returning the modulation index to its previous value.

The next step in the procedure is to determine real power flow and that may be done by determining whether the GPU is providing power to or absorbing power from the aircraft source. The GPU provides power when its voltage is leading the aircraft source, and the GPU absorbs power when its voltage is lagging the aircraft source.

If the GPU is absorbing power (drawing real current from the aircraft power source), then the power absorbed by the GPU will be stored in the DC link capacitors 27. This condition of lagging power flow will be detected by the voltage level detected by circuit 55 rising above a predetermined value. When this condition is detected, the desired frequency of the clock is set to 410 Hz and the actual frequency will be increased in 2 Hz steps until the voltage starts to decrease, at which time both the clock desired frequency and its actual frequency will be immediately set back to 400 Hz. It is also possible to execute the same increasing frequency procedure when large output currents are experienced, as explained below.

If the GPU is providing power to the aircraft bus, then the phase angle of the GPU output current will be between −90° and +90°. If the current supplied to the aircraft is in excess of 180% of the current rating of the cable to the aircraft, and the voltage on the DC bus 30 is not rising, and the current phase angle is less than ±90°, then a leading power flow condition is present. To correct an excessive leading power flow condition, the frequency of the clock 130 would normally be decreased until the GPU and the aircraft bus are in phase.

If the GPU current is more than 90° out of phase with the GPU voltage in either direction, then a lagging power flow condition is present, and the frequency of the clock will be increased, as explained above.

However, excess current may also be a result of other factors, such as the imposition of a heavy load due to the switching on of a galley, landing lights, hydraulic pumps, etc. Heavy loads can be distinguished from an out-of-phase condition by the fact that the current will not decrease for a substantial period of time, in excess of the time the GPU and aircraft power source are simultaneously connected to the aircraft bus, which is typically in the order of 50 milliseconds.

Figure 11:
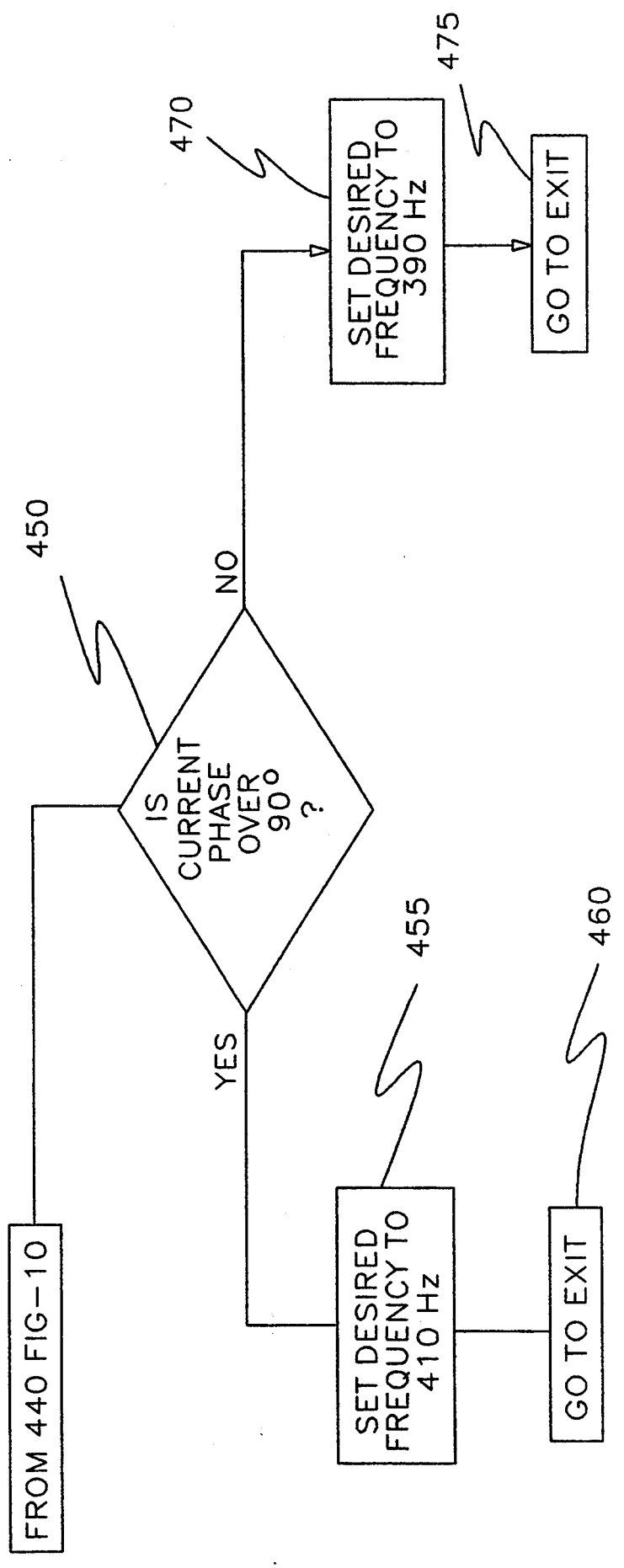

In the routine shown in FIGS. 10 and 11, if the current is both over 180% of cable rating, and over the threshold value determined by block 420, and the phase difference between the GPU voltage and current is less than 90°, then the first action taken is to set the desired frequency of the clock 130 to 390 Hz and start the clock frequency decreasing at 2 Hz per cycle of the program. If the phase difference is more than 90°, then the desired frequency is set to 410 Hz.

If the overcurrent condition is caused by an out-of-phase condition, that will soon be corrected by the change in frequency of the clock. On the other hand, if the overcurrent condition continues for more than 80 milliseconds, it is probably due to an increase in the load on the aircraft bus, in which case, the current threshold is set to at least 210% of cable current or present actual current plus 11%, the 80 millisecond timer is reset and the desired frequency is once again set to 400 Hz.

During a heavy load condition, if a no-break power transfer condition should occur, it will still be detected since the 80 millisecond timer has been reset and if the overcurrent condition exceeds 11% of that heavy load, the desired frequency will be set back to 390 Hz and the clock will begin its slow down routine, as has been explained above.

The monitoring of the voltage to the switching transistors and the current from the switching circuit and GPU itself are continuously provided to the microprocessor which analyses this data at an approximate 2.5 millisecond cycle rate.

While the form of apparatus herein described constitutes a preferred embodiment of this invention, it is to be understood that the invention is not limited to this precise form of apparatus and that changes may be made therein without departing from the scope of the invention, which is defined in the appended claims.

What is claimed is:

1. A power supply for connection to an active aircraft power bus comprising
    a direct current source of power,
    a transformer having at least one primary winding and at least one secondary winding,
    a switching circuit connected between the primary winding of said transformer and said direct current source,
    a frequency determining circuit having a nominal frequency output connected to control the operation of said switching circuit,
    a voltage sensor connected to the output of said direct current source,
    a first current sensor between said switching circuit and said transformer, and
    a second current sensor connected between a secondary winding of said transformer and the aircraft,
    a control circuit responsive to said voltage sensor and to said first and said second current sensors for adjusting the frequency of said frequency determining circuit from its nominal value.

2. The power supply of claim 1 further wherein said control circuit short circuits the primary winding of said transformer whenever the magnitude of current flowing through said second current sensor exceeds a predetermined magnitude.

3. An external power supply for use in a no-break power transfer connection to an active aircraft power bus provided with power from an internal aircraft power source, and a power transfer switch for switching between the aircraft power source and the external power supply, comprising
    a direct current source of power,
    a transformer having at least one primary winding and at least one secondary winding,
    a switching circuit connected between the primary winding of said transformer and said direct current source for providing pulses of direct current to said transformer, which provides an alternating current output from its secondary winding,
    a frequency determining circuit having a predetermined nominal frequency output connected to control the operation of said switching circuit,
    means for sensing whether the output of said secondary winding of said transformer has a leading or lagging phase angle relative to the current on said aircraft power bus from the internal aircraft power source while both the output of said transformer and the aircraft power source are connected to the aircraft power bus, and
    control circuit means responsive to said sensing means detecting a lagging phase angle for increasing the nominal frequency of said frequency determining circuit until the output frequency of said transformer is in phase with the aircraft power bus, said control circuit means being responsive to said sensing means detecting a leading phase angle for decreasing the nominal frequency output of said frequency determining circuit until the output frequency of said transformer is in phase with the aircraft power bus during such time that both the external power supply and the aircraft power source are connected to the aircraft power bus.

4. The power supply of claim 3 wherein said sensing means for determining whether the output of said secondary winding has a lagging or lagging phase includes
    a voltage sensor connected to the input to said switching circuit for indicating a rise in voltage thereon, and
    a current sensor for monitoring current flow to said aircraft,
    wherein a lagging phase is indicated by a rise in voltage detected by said voltage sensor, and wherein a leading phase is indicated by no increase in voltage detected by said voltage sensor and an increase in the current detected by said current sensor.

5. The power supply of claim 4 wherein the frequency of said frequency determining circuit is adjusted only if the current sensed by said current sensor or the voltage sensed by said current sensor is greater than a predetermined amount.

6. The power supply of claim 3 further including means for sensing the current flowing to said primary windings of said transformer and for short circuiting said primary windings whenever said current exceeds a predetermined value.

7. The power supply of claim 3 wherein said control circuit means, when detecting a lagging phase angle, increases the frequency in small increments at regular intervals, and when detecting a leading phase angle, decreases the frequency in small increments at regular intervals.

8. Method of making the output of a ground power unit compatible with an active aircraft power bus during such time that the ground power unit and an aircraft power source are both connected thereto, the method comprising the steps of
    in the ground power unit, generating an alternating current power output of a predetermined nominal frequency under the control of a direct current to alternating current inverter circuit,
    connecting the output of the inverter circuit to the aircraft power bus regardless of the relative phase angle,
    thereafter sensing the relative phase angle between the aircraft power bus and the output of the inverter circuit, and
    adjusting the frequency of the inverter circuit to either increase or decrease the frequency in predetermined incremental steps until the phase of the output current from the inverter circuit matches the phase of the aircraft power bus.

9. The method of claim 8 further including the step of monitoring tile voltage into the inverter and the current flow from the inverter as an indication of relative phase angle.

10. The method of claim 8 wherein said inverter circuit includes a power transformer, the method further including the step of short circuiting the input to said transformer whenever the current flow thereinto exceeds a predetermined value.

* * * * *